(12) United States Patent
Mital

(10) Patent No.: US 8,272,547 B1
(45) Date of Patent: Sep. 25, 2012

(54) MOTORCYCLE CARRIER APPARATUS

(76) Inventor: Mark A. Mital, Linden, MI (US)

( * ) Notice: Subject to any disclaimer, the term of this patent is extended or adjusted under 35 U.S.C. 154(b) by 367 days.

(21) Appl. No.: 12/703,512

(22) Filed: Feb. 10, 2010

(51) Int. Cl.
*B60R 9/10* (2006.01)

(52) U.S. Cl. ........ 224/537; 224/525; 224/501; 224/519; 224/924

(58) Field of Classification Search ............... 224/501, 224/521, 525, 526, 531, 532, 536, 565, 566, 224/570, 571, 924, 537; 211/17, 21; 410/3; D12/407, 408
See application file for complete search history.

(56) References Cited

U.S. PATENT DOCUMENTS

| | | | |
|---|---|---|---|
| 3,529,737 A * | 9/1970 | Daugherty | 414/462 |
| 3,720,333 A | 3/1973 | Vaughn | |
| 3,805,984 A | 4/1974 | Schwarz et al. | |
| 3,921,842 A | 11/1975 | Campbell | |
| 4,815,638 A * | 3/1989 | Hutyra | 224/525 |
| 5,462,398 A | 10/1995 | Hymer | |
| 5,699,985 A * | 12/1997 | Vogel | 224/564 |
| 5,899,655 A | 5/1999 | Miller et al. | |
| 6,460,743 B2 * | 10/2002 | Edgerly et al. | 224/324 |
| 6,579,055 B1 * | 6/2003 | Williams | 414/462 |
| 6,783,315 B1 | 8/2004 | Senechal | |
| D554,041 S * | 10/2007 | Ezra | D12/408 |
| 7,527,282 B2 | 5/2009 | Gilbert | |
| 2002/0154980 A1 * | 10/2002 | Potts | 414/462 |
| 2011/0284603 A1 * | 11/2011 | Reyes | 224/403 |

* cited by examiner

*Primary Examiner* — Justin Larson
*Assistant Examiner* — Adam Waggenspack

(57) ABSTRACT

The motorcycle carrier apparatus provides several important features, first, not only three cross supports but also two angle supports beneath the platform upon which the motorcycle is removably placed, accommodating even the heaviest of motorcycles, a removable ramp for ease in loading and unloading. A further important feature is the clamp bar that provides the dual frame mounts that bolt to a motorcycle upper frame member. The positive attachment of these frame mounts ensures that a motorcycle is rigidly mounted and supported, with no chance of unintentional motorcycle movement or potential loss. The clamp bar is importantly height adjustable so that most motorcycles are accommodated.

3 Claims, 6 Drawing Sheets

MOTORCYCLE CARRIER APPARATUS

BACKGROUND OF THE INVENTION

Various devices for holding and towing a motorcycle have been proposed and marketed. While trailers are widely used, towing a trailer is fraught with problems and concerns. And, various devices for securing a motorcycle in the bed of a truck are known. Devices that attach to a motor vehicle such as a car or truck are also known in the art. Among the devices that are secured to the rear or front of a vehicle such as a car or truck, several problems exist. Most of these problems are in regard to properly securing and sturdily supporting a motorcycle. Some motorcycles are quite heavy, weighing up to 900 pounds or more in many cases. Associated dangers cannot be taken lightly. Failure to properly support such motorcycles can result in damage to the carrier vehicle and the motorcycle, and even further result in disastrous accidents. Additionally, loading a motorcycle on many of these devices is difficult, especially a heavy motorcycle.

Devices that pivot to allow loading are not appropriate for heavy motorcycles, as pivoting such is difficult and dangerous, if not totally impossible, even if more than one person is recruited for the task. A further problem in sturdily supporting a motorcycle on such devices regards securing the motorcycle, once mounted. Straps that tie a motorcycle against its spring pressures, for example, do not sufficiently secure the cycle. The present apparatus provides a unique carrier that allows easy loading of a motorcycle, and further provides for completely securing the cycle against movement or loss. Further, the apparatus uses a vehicle's existing receiver hitch.

FIELD OF THE INVENTION

The motorcycle carrier apparatus relates to motorcycle haulers and more especially to a carrier apparatus that uses a vehicle's existing receiver hitch.

SUMMARY OF THE INVENTION

The general purpose of the motorcycle carrier apparatus, described subsequently in greater detail, is to provide a motorcycle carrier apparatus which has many novel features that result in an improved motorcycle carrier apparatus which is not anticipated, rendered obvious, suggested, or even implied by prior art, either alone or in combination thereof.

To attain this, the motorcycle carrier apparatus provides several important features. First, the apparatus importantly provides not only three cross supports but also ideally two angle supports beneath the platform upon which the motorcycle is removably placed. The multiple supports provide for sturdy support of even the heaviest motorcycles. The apparatus also provides a ramp having a length about equal to the platform that supports the motorcycle so that loading and unloading a cycle can be more easily accomplished. A further important feature is the clamp bar that provides the dual frame mounts that bolt to a motorcycle upper frame member. A motorcycle affixed to the frame mounts must first have its seat removed. The positive attachment of these frame mounts ensures that a motorcycle is rigidly mounted and supported, with no chance of unintentional motorcycle movement or potential loss. The clamp bar is importantly height adjustable so that most motorcycles are accommodated. The ideal height adjustment may be angled sleeves with inserts having uprights attached upwardly. The angled sleeves are available in varying angles so that many makes of motorcycles are provided for.

Thus has been broadly outlined the more important features of the improved motorcycle carrier apparatus so that the detailed description thereof that follows may be better understood and in order that the present contribution to the art may be better appreciated.

An object of the motorcycle carrier apparatus is to support even an especially heavy motorcycle.

Another object of the motorcycle carrier apparatus is to mount within a receiver hitch of a vehicle and negate the use of wheels on the apparatus.

An added object of the motorcycle carrier apparatus is to positively connect to a frame member of a motorcycle.

A further object of the motorcycle carrier apparatus is to provide for easy loading and unloading These together with additional objects, features and advantages of the improved motorcycle carrier apparatus will be readily apparent to those of ordinary skill in the art upon reading the following detailed description of presently preferred, but nonetheless illustrative, embodiments of the improved motorcycle carrier apparatus when taken in conjunction with the accompanying drawings.

In this respect, before explaining the current embodiments of the improved motorcycle carrier apparatus in detail, it is to be understood that the motorcycle carrier apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved motorcycle carrier apparatus. It is therefore important that the claims be regarded as including such equivalent constructions insofar as they do not depart from the spirit and scope of the motorcycle carrier apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the motorcycle carrier apparatus generally designated by the reference number 10 will be described.

Figure 3:
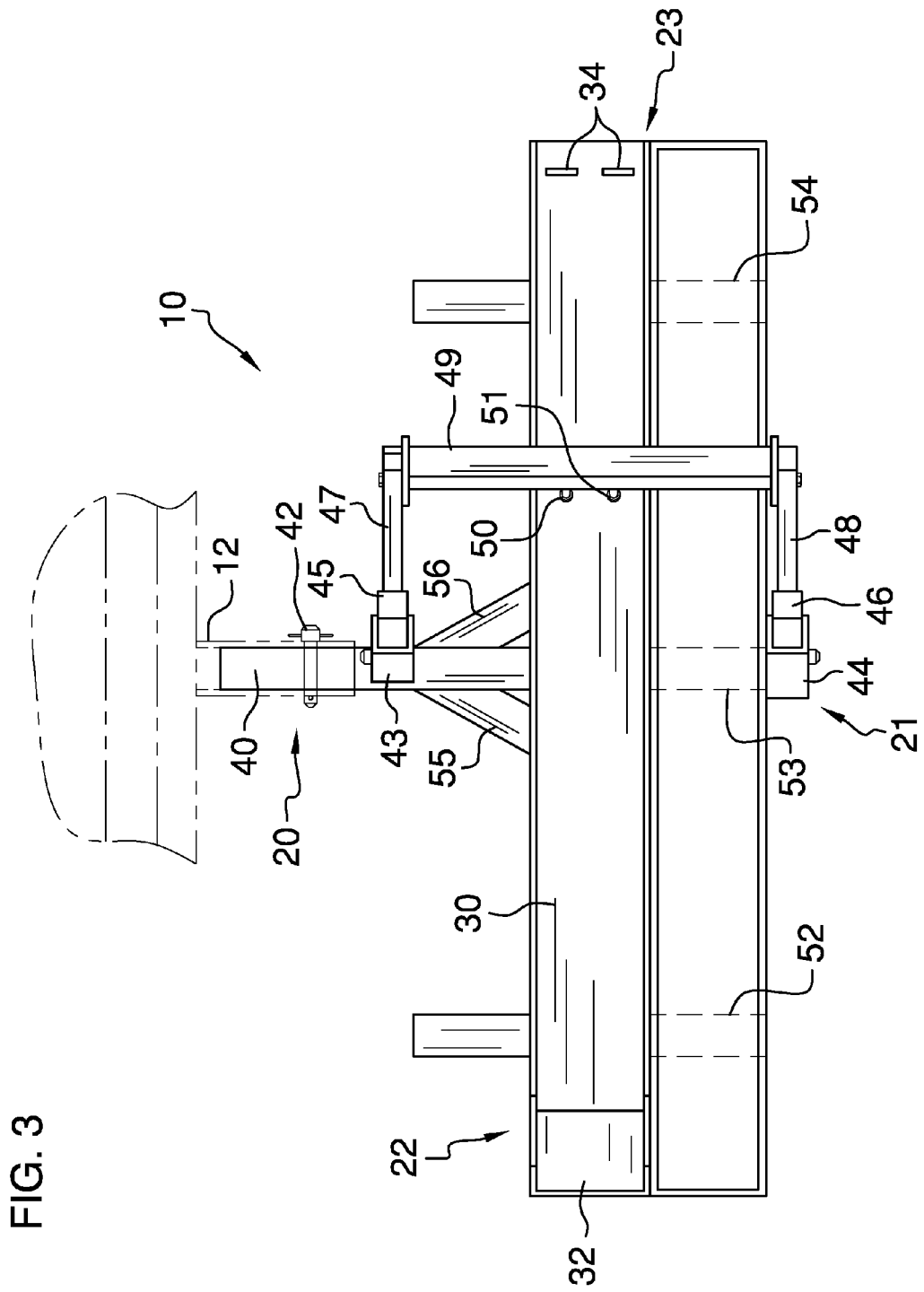
FIG. 3 is a top plan view of the apparatus.

Referring to FIG. 3, the apparatus 10 partially comprises a front 20 spaced apart from a back 21 and a first end 22 spaced apart from a second end 23.

Figure 1:
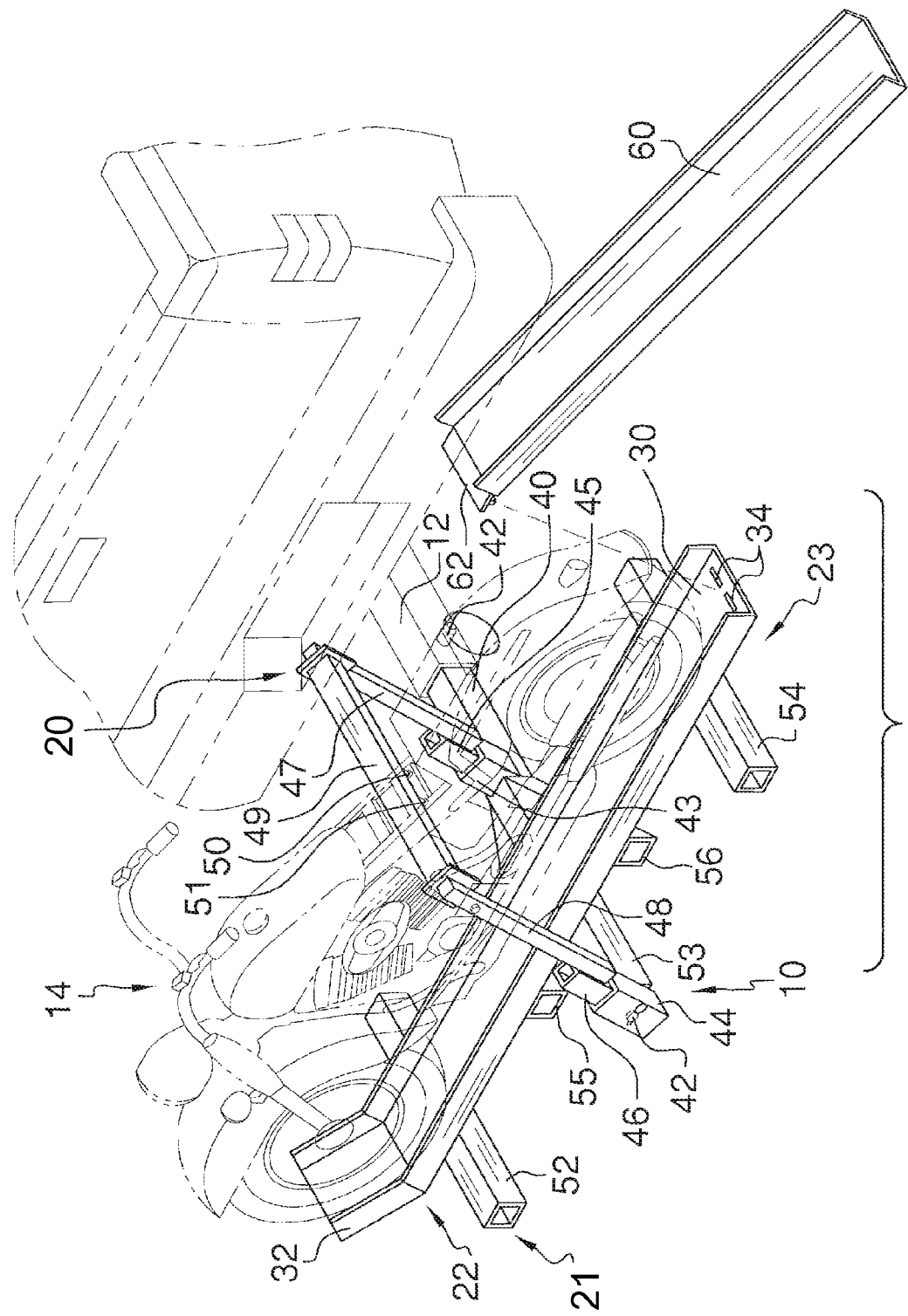
FIG. 1 is a perspective view of the apparatus in use, with the hitch insert inserted into the existing receiver hitch.
Figure 2:
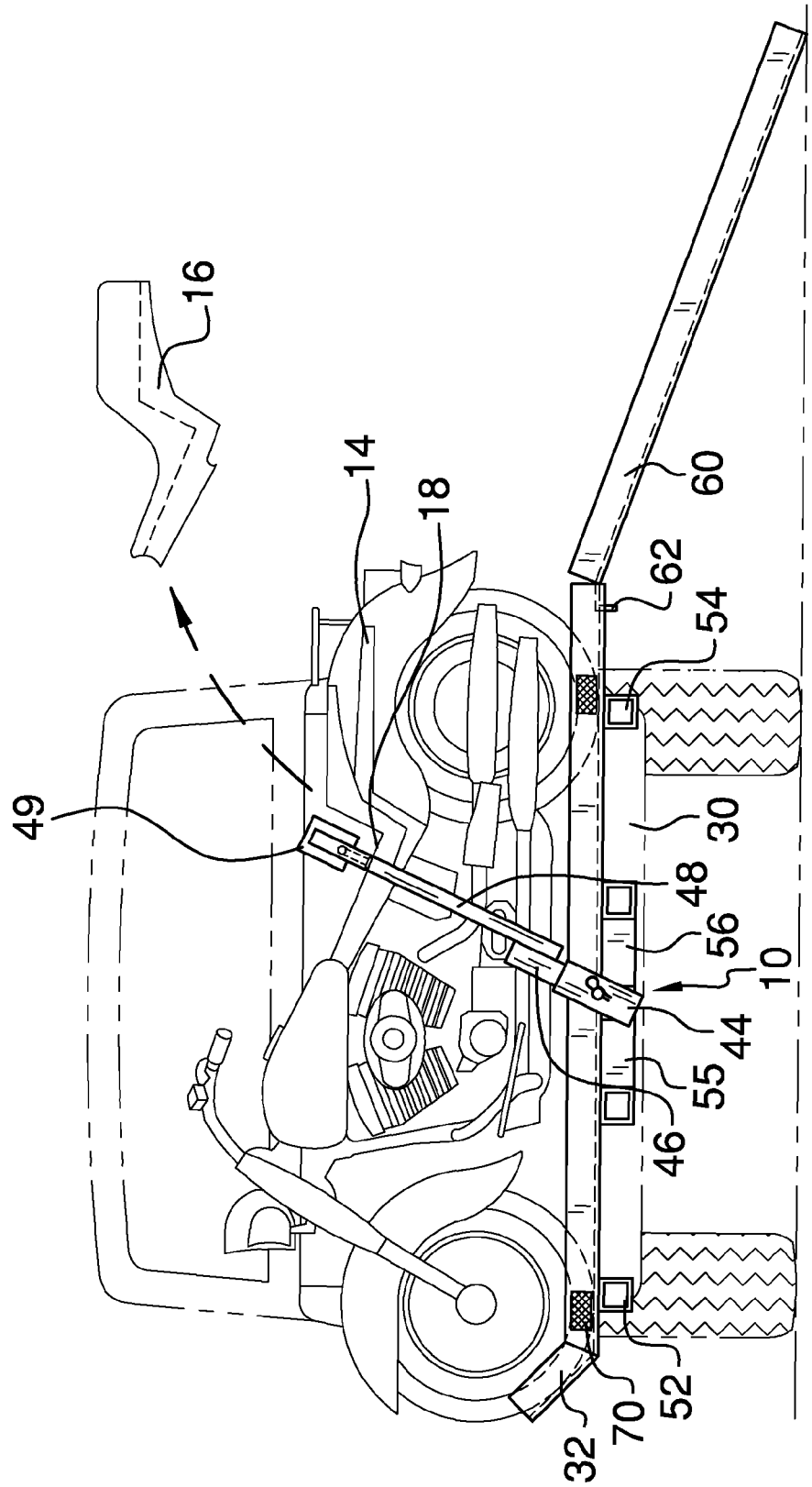
FIG. 2 is a rear elevation view of the apparatus in use with a motorcycle mounted on the platform and secured by the frame mounts.

Referring to FIGS. 1 and 2, the u-shaped platform 30 removably receives the tires of an existing motorcycle 14. The platform upturn 32 is disposed on the first end 22 of the u-shaped platform 30. The platform upturn 32 prevents a motorcycle 14 from exiting the first end 22 of the platform 30.

The pair of identical apertures 34 is disposed within the second end 23 of the u-shaped platform 30.

The platform upturn 32 prevents a motorcycle 14 from exiting the first end 22 of the platform 30. The pair of identical notches 34 is disposed within the second end 23 of the u-shaped platform 30.

Figure 6:
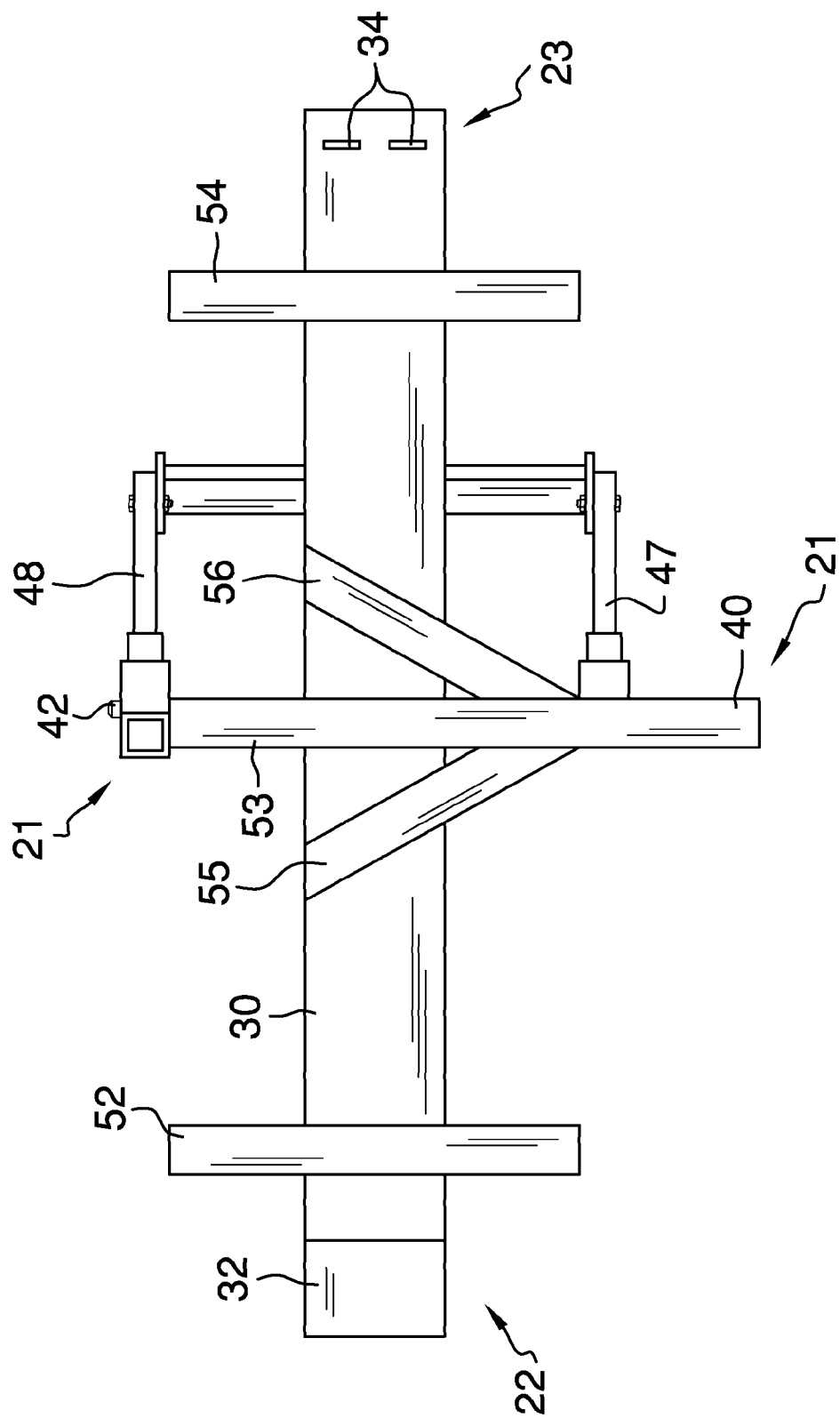
FIG. 6 is a bottom plan view.

Referring to FIG. 6, the trio of spaced apart cross supports is disposed beneath the platform 30. The cross supports comprise the first cross support 52 disposed beneath the platform 30 first end 22. The third cross support 54 is disposed beneath the platform 30 second end 23. The second cross support 53 is disposed centrally between the first cross support 52 and the third cross support 54. The second cross support 53 is extended into the hitch insert 40 at the front 20. The hitch insert 40 is removably inserted within an existing receiver hitch 12 of a given vehicle. The hitch insert 40 is removably retained by a removable hitch pin 42. Each cross support is extended toward the back 21 from under the platform 30. The first angle support 55 is extended from the second cross support 53 and angled toward the first end 22. The second angle support 56 is extended from proximal to the hitch insert 40 and under the platform 30. The second angle support 56 is extended from the second cross support 53 and angled toward the second end 23.

Figure 5:
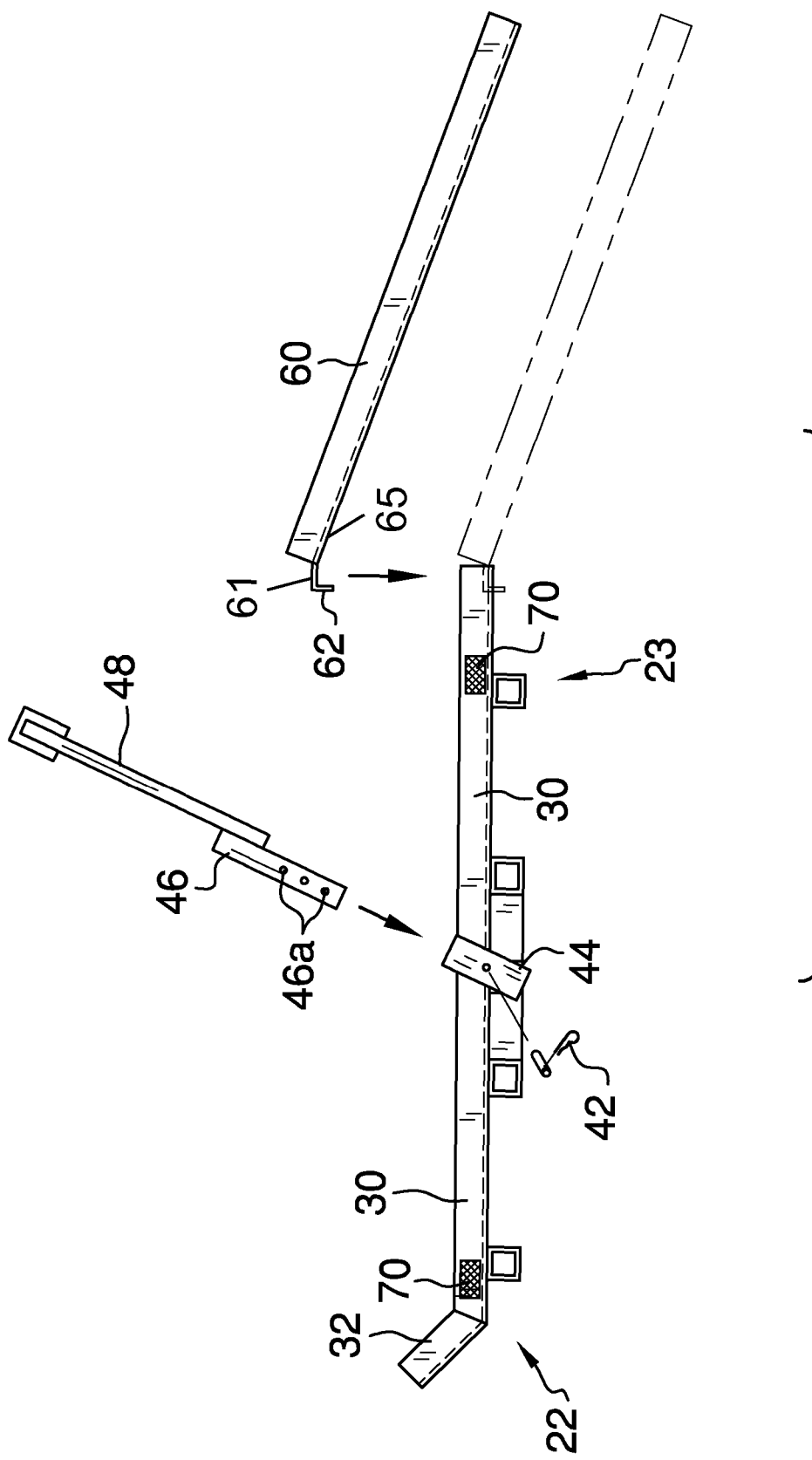
FIG. 5 is a rear elevation view of the apparatus, with ramp removed and first and second inserts removed from the angled sleeves.

Referring to FIG. 5, the ramp 60 is removably disposed adjacent to the platform 30 atop the cross supports at the back 21. A lip 61, having projections 62 disposed on a bottom side 63 thereof, is disposed on a bottom wall 65 on one end of the ramp 60. The projections are removably disposed within the platform apertures 34. The ramp 60 thereby removably extends from the platform 30 second end 23.

Figure 4:
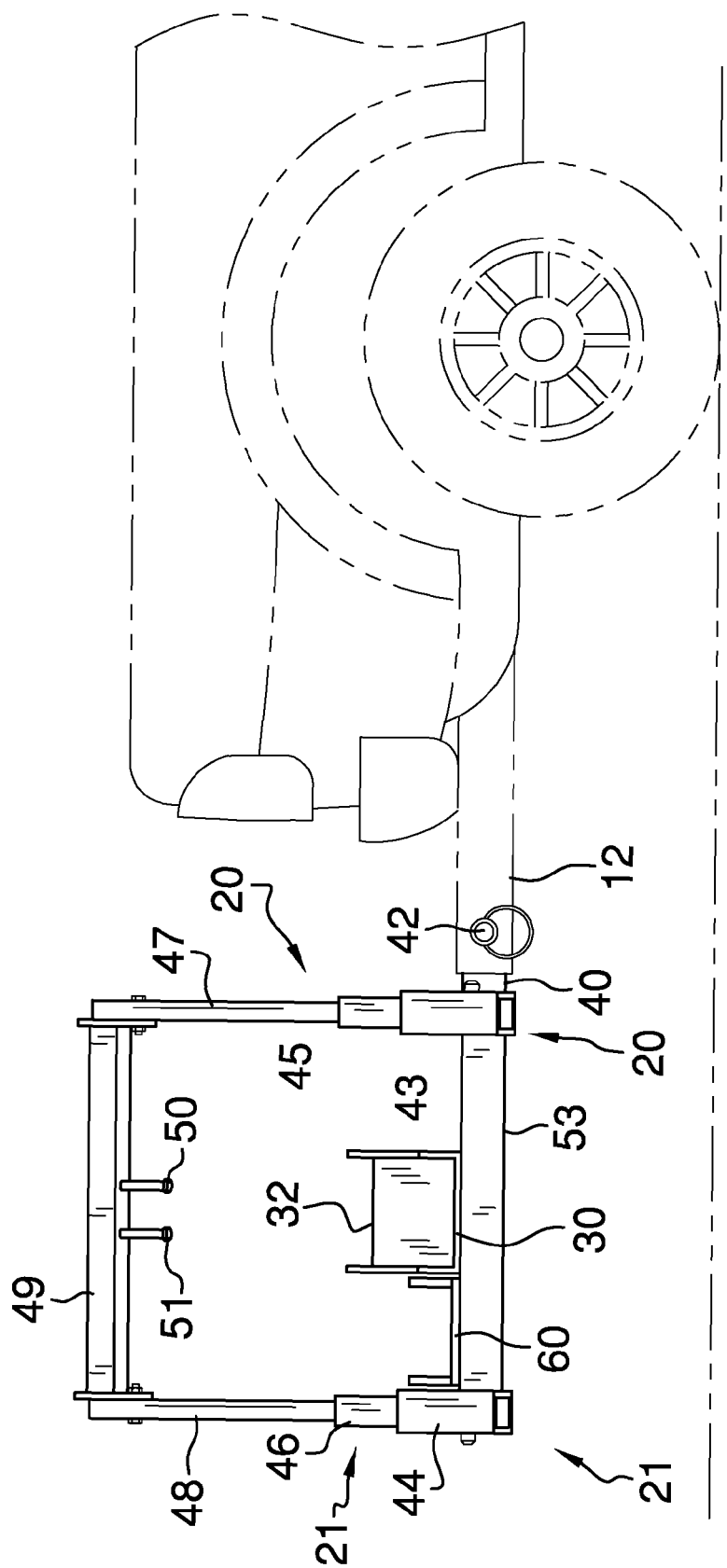
FIG. 4 is a side elevation view of the apparatus with hitch insert inserted into the existing receiver hitch of a vehicle.

Referring to FIG. 4, the first angled sleeve 43 is disposed on the second cross support 53 at the front 20, proximal to the hitch insert 40. The first angled sleeve 43 is angled upwardly toward the second end 23. The second angled sleeve 44 is disposed on the second cross support 53 at the back 21. The second angled sleeve 44 is parallel with the first angled sleeve 43. An identical insert is removably and height adjustably disposed within each angled sleeve.

Referring again to FIG. 5, each insert is adjustable in height via a hitch pin 42 selectively inserted within each sleeve and through a chosen orifice 46a.

Referring again to FIG. 3, the inserts comprise the first insert 45 disposed within the first angled sleeve 43 and the second insert 46 disposed within the second angled sleeve 44. The first upright 47 is attached upwardly to the first insert 45. The second upright 48 is attached upwardly to the second insert 46. The clamp bar 49 extends between and joins the tops of the uprights 47, 48 to each other.

The pair of spaced apart frame mounts is affixed downwardly to the clamp bar 49. The frame mounts are importantly parallel to the uprights to secure a motorcycle 14 in place during transport in view of the angle at which the first and second angled sleeves 43, 44 are mounted on the second cross support 53. The frame mounts comprise the first frame mount 50 and the second frame mount 51. The frame mounts are removably attached to an existing frame member 18 of an existing motorcycle 14. The frame mounts are attached to the frame member 18 after removal of the motorcycle 14 seat 16, thereby importantly providing positive and unmoving securing of the motorcycle 14 to the apparatus 10.

With respect to the above description then, it is to be realized that the optimum dimensional relationships for the parts of the motorcycle carrier apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the motorcycle carrier apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the motorcycle carrier apparatus may be used.

Therefore, the foregoing is considered as illustrative only of the principles of the motorcycle carrier apparatus. Further, since numerous modifications and changes will readily occur to those skilled in the art, it is not desired to limit the motorcycle carrier apparatus to the exact construction and operation shown and described, and accordingly, all suitable modifications and equivalents may be resorted to, falling within the scope of the motorcycle carrier apparatus.

What is claimed is:

1. A motorcycle carrier apparatus comprising, in combination:
    a front spaced apart from a back, a first end spaced apart from a second end;
    a u-shaped platform for removably receiving the tires of an existing motorcycle;
    a platform upturn disposed on the first end of the u-shaped platform;
    a pair of identical apertures disposed within the second end of the u-shaped platform;
    a trio of spaced apart cross supports disposed beneath the platform comprising a first cross support disposed beneath the platform first end, a third cross support disposed beneath the platform second end, and a second cross support disposed centrally between the first cross support and the third cross support, the second cross support extended into a hitch insert at the front, the hitch insert configured to be removably inserted within an existing receiver hitch, each cross support extended toward the back from under the platform;
    a ramp removably disposed adjacent to the platform atop the cross supports at the back;
    a lip having projections disposed on a bottom side thereof, the lip disposed on one end of the ramp on a bottom wall thereof, the projections removably disposed within the platform apertures, the ramp thereby removably extended from the platform second end;
    a first upright height adjustably attached upwardly to the second cross brace, the first upright affixed to the second cross brace proximal to the hitch insert;
    a second upright height adjustably attached upwardly to the second cross brace, the second upright affixed to the second cross brace at the back;
    a clamp bar extends between and joins the tops of the uprights to each other;
    a pair of spaced apart frame mounts affixed downwardly to the clamp bar, the frame mounts parallel to the uprights, the frame mounts comprising a first frame mount and a second frame mount, the frame mounts configured to be removably attached to an existing frame member of an existing motorcycle.

2. A motorcycle carrier apparatus comprising, in combination:
    a front spaced apart from a back, a first end spaced apart from a second end;
    a u-shaped platform for removably receiving the tires of an existing motorcycle;

a platform upturn disposed on the first end of the u-shaped platform;

a pair of identical apertures disposed within the second end of the u-shaped platform;

a trio of spaced apart cross supports disposed beneath the platform comprising a first cross support disposed beneath the platform first end, a third cross support disposed beneath the platform second end, and a second cross support disposed centrally between the first cross support and the third cross support, the second cross support extended into a hitch insert at the front, the hitch insert configured to be removably inserted within an existing receiver hitch, each cross support extended toward the back from under the platform;

a ramp removably disposed adjacent to the platform atop the cross supports at the back;

a lip having projections disposed on a bottom side thereof, the lip disposed on a one end of the ramp on a bottom wall thereof, the projections removably disposed within the platform apertures, the ramp thereby removably extended from the platform second end;

a first angled sleeve disposed on the second cross support at the front, the first angled sleeve angled upwardly toward the second end;

a second angled sleeve disposed on the second cross support at the back, the second angled sleeve parallel with the first angled sleeve;

an identical insert removably and height adjustably disposed within each angled sleeve, comprising a first insert disposed within the first angled sleeve, a second insert disposed within the second angled sleeve;

a first upright attached upwardly to the first insert;

a second upright attached upwardly to the second insert;

a clamp bar extends between and joins the tops of the uprights to each other;

a pair of spaced apart frame mounts affixed downwardly to the clamp bar, the frame mounts parallel to the uprights, the frame mounts comprising a first frame mount and a second frame mount, the frame mounts configured to be removably attached to an existing frame member of an existing motorcycle.

3. A motorcycle carrier apparatus comprising, in combination:

a front spaced apart from a back, a first end spaced apart from a second end;

a u-shaped platform for removably receiving the tires of an existing motorcycle;

a platform upturn disposed on the first end of the u-shaped platform;

a pair of identical apertures disposed within the second end of the u-shaped platform;

a trio of spaced apart cross supports disposed beneath the platform comprising a first cross support disposed beneath the platform first end, a third cross support disposed beneath the platform second end, and a second cross support disposed centrally between the first cross support and the third cross support, the second cross support extended into a hitch insert at the front, the hitch insert configured to be removably inserted within an existing receiver hitch, each cross support extended toward the back from under the platform;

a first angle support extended from the second cross support and angled toward the first end;

a second angle support extended from proximal to the hitch insert and under the platform, the second angle support extended from the second cross support and angled toward the second end;

a ramp removably disposed adjacent to the platform atop the cross supports at the back;

a lip having projections disposed on a bottom side thereof, the lip disposed on a one end of the ramp on a bottom wall thereof, the projections removably disposed within the platform apertures, the ramp thereby removably extended from the platform second end;

a first angled sleeve disposed on the second cross support at the front, proximal to the hitch insert, the first angled sleeve angled upwardly toward the second end;

a second angled sleeve disposed on the second cross support at the back, the second angled sleeve parallel with the first angled sleeve;

an identical insert removably and height adjustably disposed within each angled sleeve, comprising a first insert disposed within the first angled sleeve, a second insert disposed within the second angled sleeve;

a first upright attached upwardly to the first insert;

a second upright attached upwardly to the second insert;

a clamp bar extends between and loins the tops of the uprights to each other;

a pair of spaced apart frame mounts affixed downwardly to the clamp bar, the frame mounts parallel to the uprights, the frame mounts comprising a first frame mount and a second frame mount, the frame mounts configured to be removably attached to an existing frame member of an existing motorcycle.

* * * * *